(12) United States Patent
Robinson

(10) Patent No.: US 6,347,696 B1
(45) Date of Patent: Feb. 19, 2002

(54) STRUCTURED PACKING LOADING SLIDE

(75) Inventor: James T. Robinson, League City, TX (US)

(73) Assignee: AltairStrickland, Inc., Deer Park, TX (US)

( * ) Notice: Subject to any disclaimer, the term of this patent is extended or adjusted under 35 U.S.C. 154(b) by 0 days.

(21) Appl. No.: 09/518,503

(22) Filed: Mar. 3, 2000

(51) Int. Cl.[7] .............................................. B65G 11/00
(52) U.S. Cl. ........................................ 193/22; 261/112
(58) Field of Search ....................... 193/15, 22; 261/97, 261/112.2

(56) References Cited

U.S. PATENT DOCUMENTS 3,931,877 A * 1/1976 Albaugh ...................... 193/15
5,188,773 A * 2/1993 Chen et al. ............... 261/112.2

* cited by examiner

Primary Examiner—Kenneth W. Noland
(74) Attorney, Agent, or Firm—Keeling Law Firm

(57) ABSTRACT

A method for loading structured packing into a tower, such as a vacuum tower in a petrochemical plant. The system uses a removable slide positioned in a manway opening, wherein the structured packing is slid down to a bottom stage in the receiving area. The packing is then unloaded and stacked onto a distribution tray. As the packing reaches a predetermined height, the bottom stage is repositioned on top of the structured packing. To accommodate the new angle and distance between the bottom stage and manway, a section of the slide is removed. While the slide is in use, its upper receiving area partially blocks the manway opening. To afford workers to capability to exit through the manway, the upper receiving area swings upward and away from the manway, and is stowed inside the tower.

9 Claims, 7 Drawing Sheets

STRUCTURED PACKING LOADING SLIDE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of Invention

This invention relates to a system of loading structured packing into a tower. Specifically, the invention describes a system comprising a removable slide mechanism for internal placement and stacking of structured packing on distribution trays inside a process tower, such as a vacuum tower.

2. Related Art and Background Information

The art of using ramps and slides for transporting material has long been known. In the field of construction and maintenance, particularly in the petrochemical industry, material slides are used primarily for removing trash and demolished materials, where the effect on the material from being slid down a chute or slide does not matter. The present invention, however, is designed specifically to minimize the damage to specialized material, specifically structured packing material.

In the petrochemical industry, process towers, including vacuum towers, are used to promote liquid/vapor interfaces between different chemicals inside the tower during chemical processing. Typically, the liquid is sprayed or sprinkled downward inside the top portion of the tower, and continues to fall to the bottom of the tower due to gravity. At the same time, the lighter vapor from the interior bottom of the tower is forced upward, typically by a vacuum pulling from the top. As the heavier liquid and lighter vapors interface by passing across each other, a chemical reaction occurs, creating the desired product.

Located within the tower is packing that provides a greater interior surface area. This large area provides more surface to which the liquids and vapors each adhere, thus promoting their interaction and subsequent chemical reaction and/or bonding. The packing is often structured packing, which is comprised of structured packing sections, each section being a quadrilateral prism comprising metal corrugated sheets. A typical dimension for a structured packing section is 72"×12"×8", weighing 30–40 pounds. This packing must be replaced when internal modifications or repairs to the tower are required, or when a new design of the structured packing and structured packing sections is developed. The old packing is removed by hand and discarded.

Distribution trays supporting the structured packing are located in the interior of the tower. The structured packing sections are typically stacked on top of each other until they nearly reach the next highest distribution tray in the tower. The manway to access the interior of the tower is located just below each distribution tray, and worker access to the lower distribution tray is achieved by climbing through the manway and down a portable flexible rope.

In the prior art, new structured packing was lowered through a manway with a rope down to a supporting distribution tray inside the tower. This method had two main disadvantages.

First, the process was slow. A packing replacement operation may involve over 12,000 sections of structured packing. The time required to rig each section, lower it down, and untie it from the rope was costly, both in labor cost as well as lost production time for the tower. Due to the high number of sections being singularly installed, a reduction of even one minute per section in the time required to lower it into position would have great cost savings. In the case of a 12,000 section turnaround job, a one minute per section saving would translate to reducing the time that the tower was out of operation by over eight days. It is common for such towers to produce over $1,000,000 worth of product per day. Thus, the cost savings of the current invention, which is estimated to save between 1–3 minutes per section, are significant.

Second, the process of lowering each structured packing section often damaged the packing, which is typically constructed of thin corrugated metal sheets. This resulted in reduced process efficiency due to the damaged structured packing.

It would therefore be a new and useful improvement of the prior art for a method to afford quick and efficient loading and arrangement of structured packing sections into processing towers without damaging the structured packing.

BRIEF SUMMARY OF THE INVENTION

Accordingly, the objectives of this invention are to provide, inter alia, a new and improved method of loading structured packing into a process tower that:

- is time efficient;
- does not damage the structured packing;
- can be built to accommodate standard sized structured packing;
- is lightweight and easily set up within the process tower;
- is relatively inexpensive; and
- is easily modifiable to accommodate different heights and levels of packing.

These objectives are addressed by the structure and use of the inventive removable slide loading system. The structured packing is slid down to a receiving area, and then stacked on a distribution tray to form a packing bed. As the packing bed gets higher from the stacking of the structured packing sections, the slide is shortened and the bottom stage is raised.

Other objects of the invention will become apparent from time to time throughout the specification hereinafter disclosed.

DETAILED DESCRIPTION OF THE INVENTION

The present invention is described and depicted as loading system 10.

Figure 1:
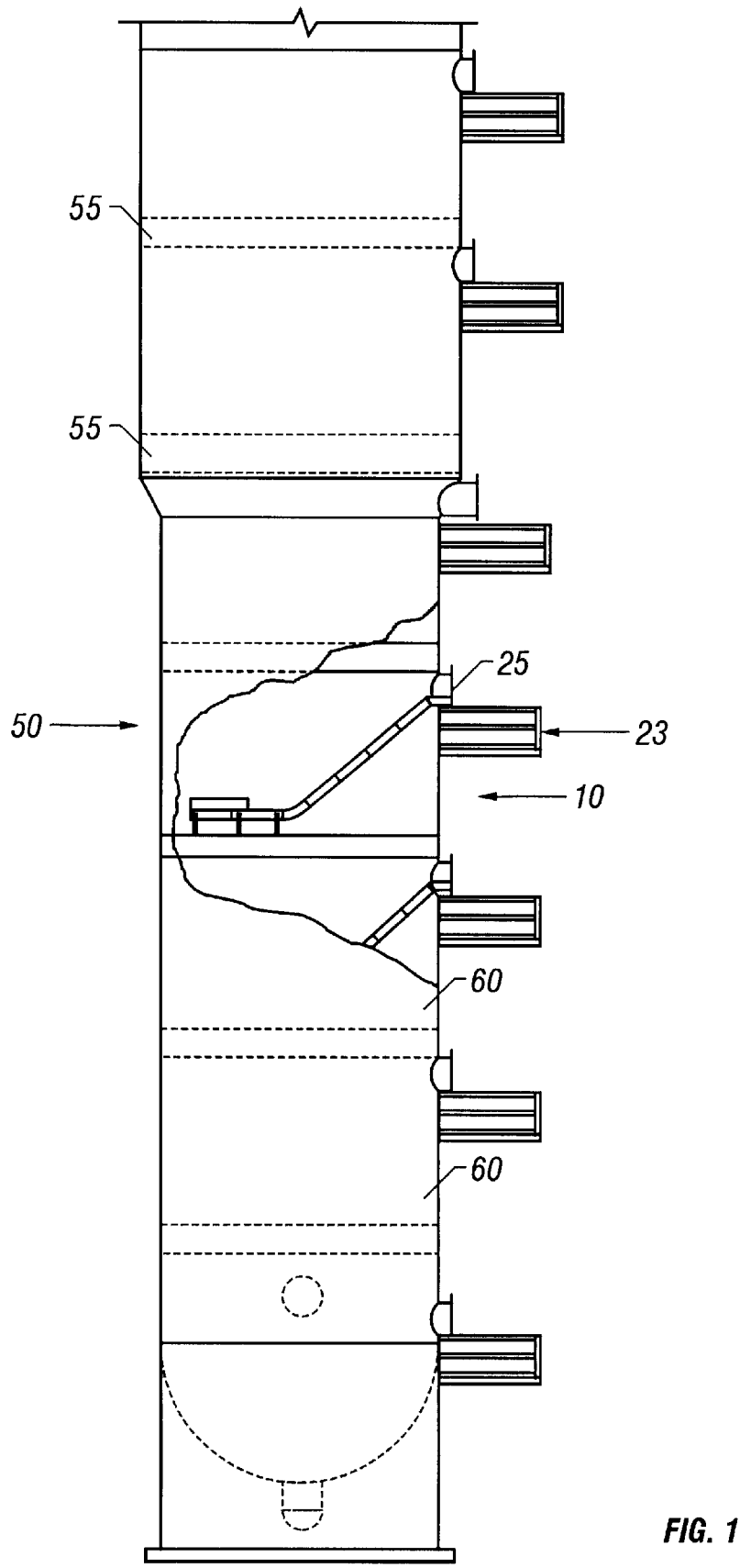
FIG. 1 depicts a typical process tower in cut-away view.

A typical process tower 50 is depicted in FIG. 1. Process tower 50 may be over 150' high, have a radius between 25' and 30', and typically has multiple packing beds 60 each supported by a separate distribution tray 55. Where process tower 50 is a vacuum tower, liquid is sprinkled downward from the top interior of process tower 50, while lighter vapors are pulled upward from the bottom interior of process tower 50. Packing beds 60 provide increased surface areas for the heavier liquid and lighter vapors to adhere and interact.

Figure 2:
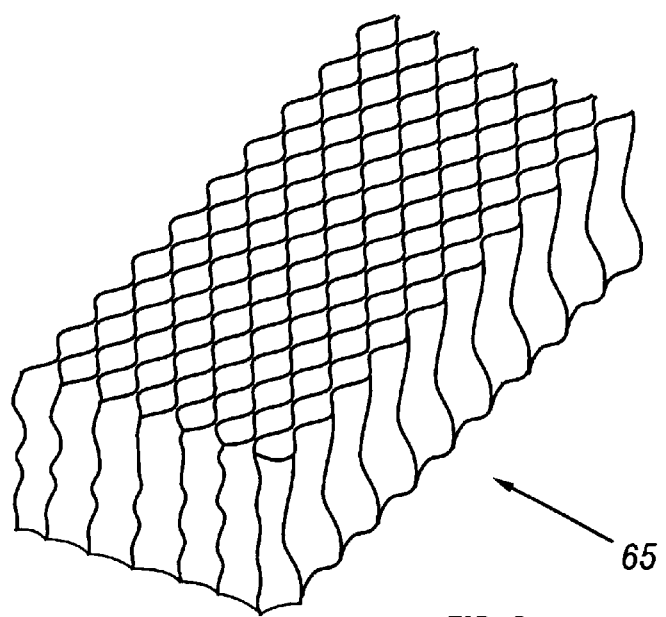
FIG. 2 depicts a typical section of structured packing material.

A typical structure of structured packing section 65 is depicted in FIG. 2. Packing beds 60 comprising structured packing sections 65 are formed by stacking structured packing sections 65. Packing beds 60 typically reach from their supporting distribution tray 55 to within a foot below the next highest distribution tray 55.

Packing beds 60 are replaced when an improved design of the distribution system or structured packing sections 65 is developed. The old packing is typically discarded by manually unloading it through a manway 25, and manually loaded into a material basket attached to a crane for lowering to the ground. Since the old packing is often discarded, it usually does not matter if the old packing is damaged when removed.

Figure 3:
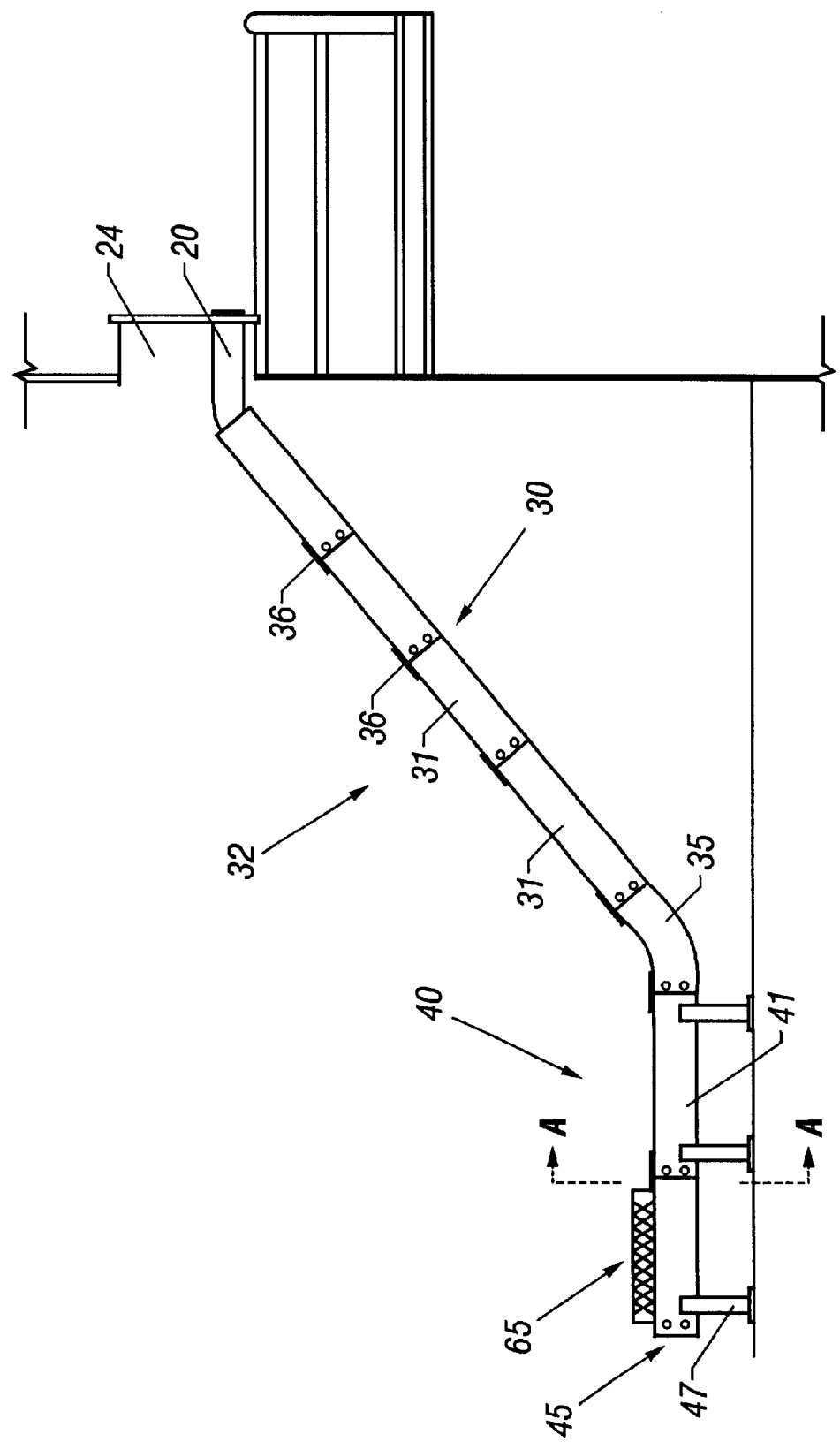
FIG. 3 depicts the preferred embodiment of the inventive slide.

Loading system 10, comprising bottom stage 40, slide slope 30 and top loading receiver 20, is depicted in FIG. 3.

Figure 4:
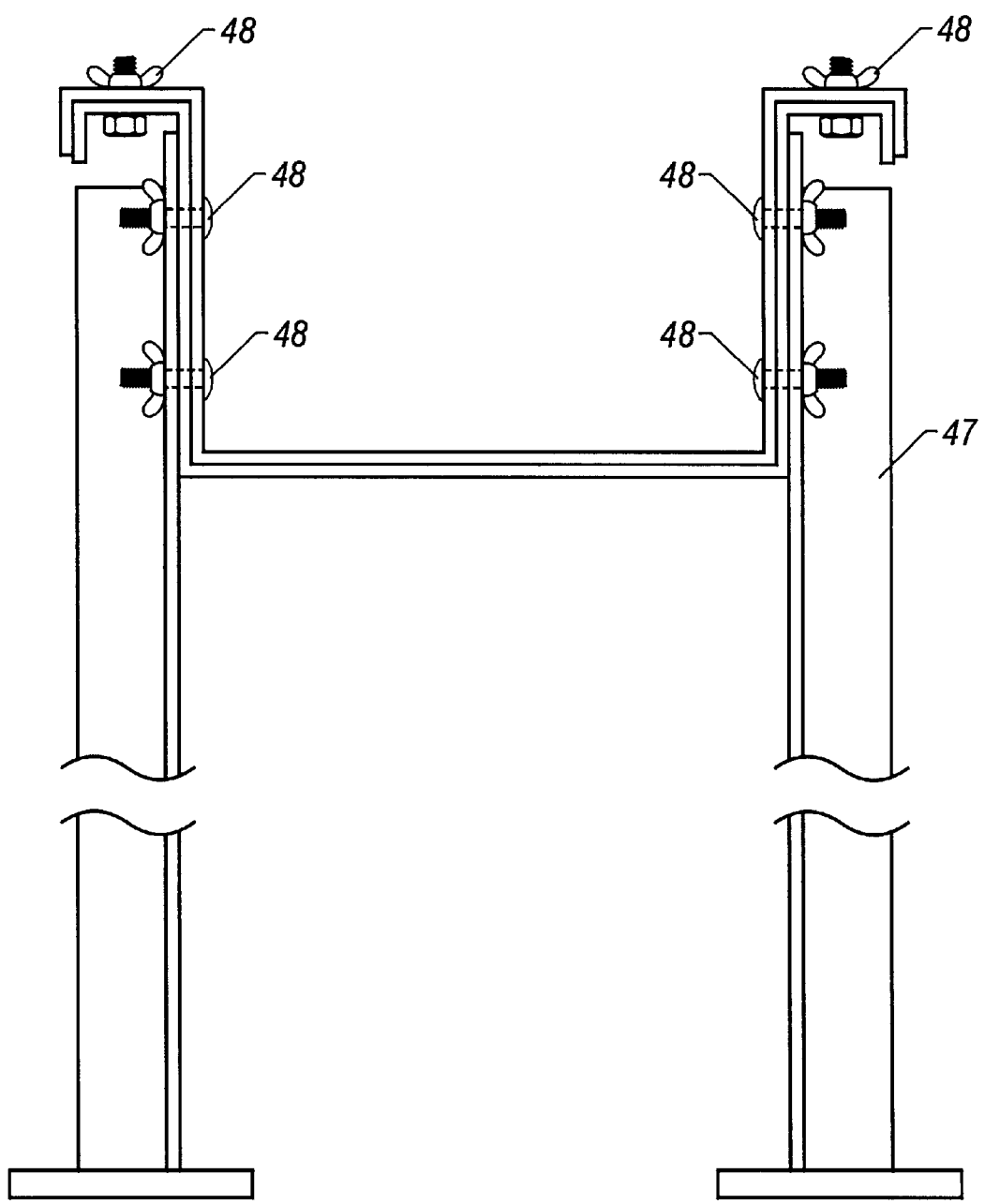
FIG. 4 depicts a cross-sectional view of the bottom stage across line A—A seen in FIG. 3.

Bottom stage 40 is located in receiving area 45. Receiving area 45 is initially located directly on distribution tray 55, as shown in FIG. 1. As structured packing sections 65 are unloaded and stacked on distribution tray 55, receiving area 45 moves upward as bottom stage 40 is repositioned on top of the stacked structured packing sections 65. Bottom stage 40 comprises at least one bottom staging section 41. In the preferred embodiment, bottom staging section 41 is constructed of 20 gauge sheet metal. Bottom stage 40 is supported by a plurality of support legs 47, which rest either directly on distribution tray 55, or on a load distributing surface (such as a sheet of plywood, not shown) that is laid on top of the stacked structured packing sections 65 as described above. As seen in the cross sectional view of FIG. 4, bottom staging section 41 is attached, preferably with easily engaged attachment mechanism such as carriage bolts with wing nuts, between support legs 47. If there are more than one bottom staging section 41, they are connected end-to-end to each other with similar attachment mechanisms, depicted in FIG. 4 as bottom staging section connectors 48.

In the preferred embodiment, radius section 35 provides a transition curve between bottom stage 40 and slide slope 30. In the preferred embodiment, radius section 35 and slide slope 30 are constructed of 20 gauge sheet metal, and have a coefficient of friction small enough to allow structured packing sections 65 to slide all the way down to bottom stage 40 at all levels of receiving area 45 described below, while having a coefficient of friction high enough such that structured packing sections 65 are not damaged by excessive velocity when reaching bottom stage 40. For the same reason, radius section 35 has a radius of curvature appropriate for the size of structured packing sections 65 after they slide down slide slope 30 and before reaching bottom stage 40.

Figure 5:
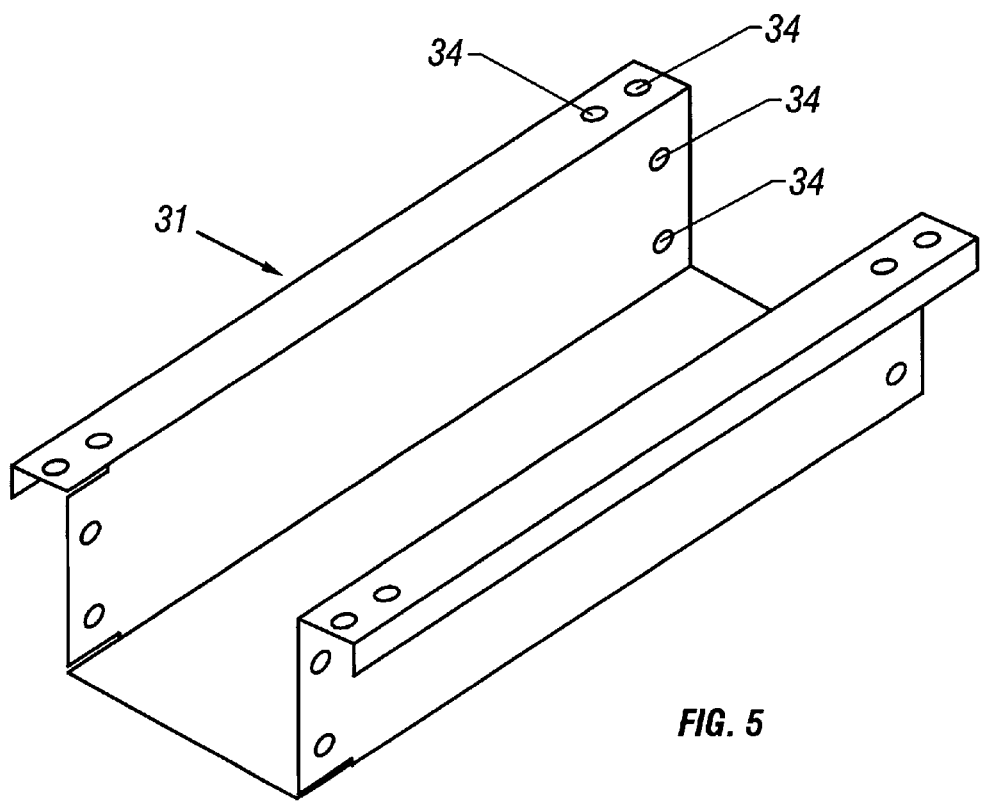
FIG. 5 depicts a slide slope section.
Figure 6:
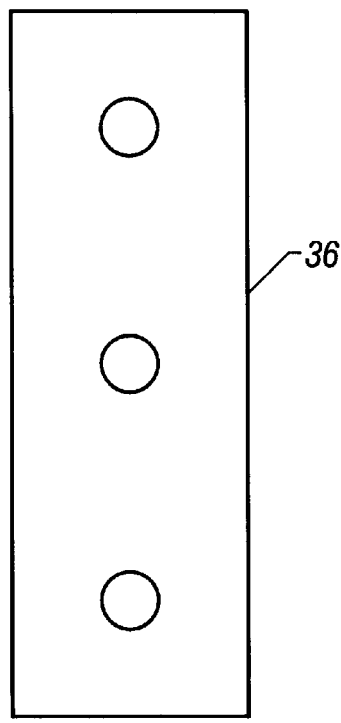
FIG. 6 depicts a preferred supporting section bracket.

Slide slope 30 is constructed of at least one slide slope section 31, depicted in FIG. 5. If there are more than one slide slope sections 31, they are connected end-to-end with slide slope section connectors 29, which, like bottom staging section connectors 48, are preferably easily engaged with the bare hand or with common hand tools. Slide slope section connectors 29 traverse through slide slope section connection holes 34, which are aligned as the ends of slide slope sections 31 overlap to form a double layer for said connection, and secure section brackets 36, shown in FIG. 6, for additional support. In the preferred embodiment, section brackets 36 are similarly used for additional support in all end-to-end connections, including those found in bottom stage 40 and radius section 35. These connections create a strong and rigid slide slope 30 from slide slope sections 31. As noted above, slide slope sections 31 are preferably constructed of 20-gauge sheet metal with appropriate coefficients of friction between their surface and structured packing sections 65.

Figure 7:
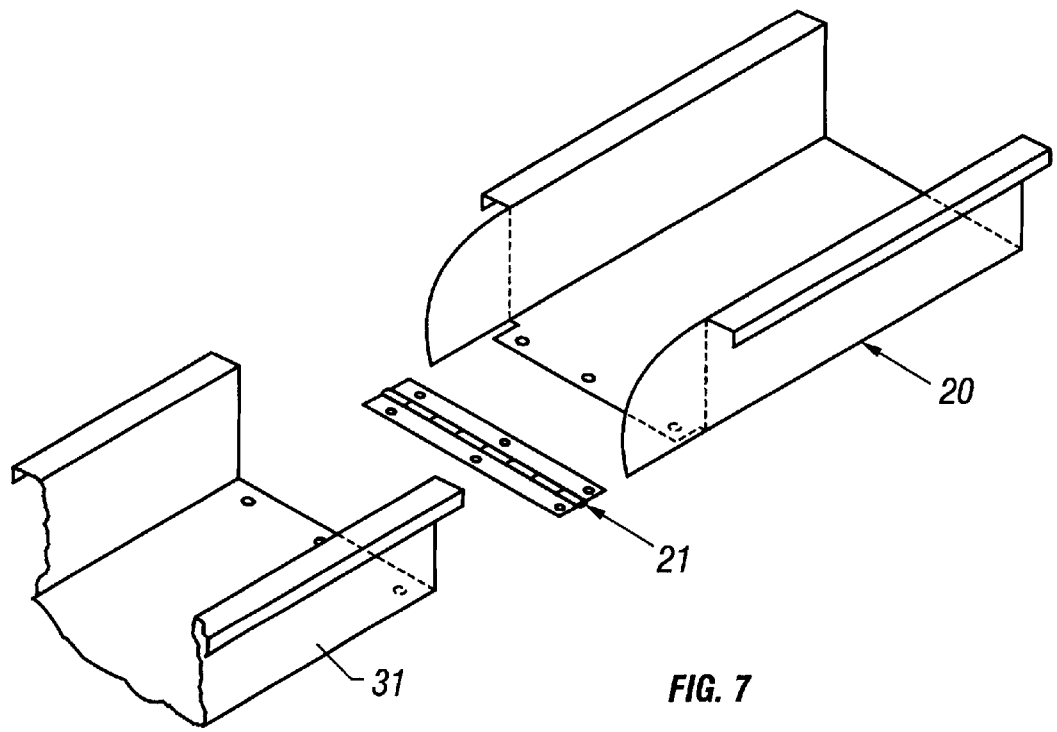
FIG. 7 depicts the hinge connection of the top loading receiver.
Figure 11:
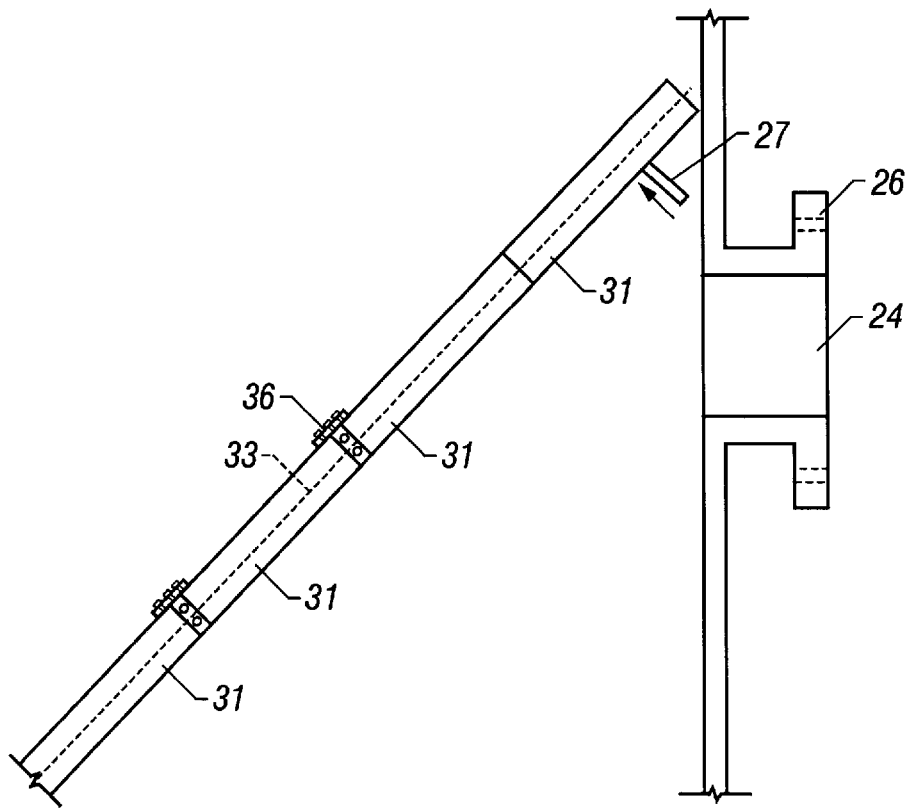
FIG. 11 depicts the inventive loading system positioned away from an entry manway to afford worker egress from the process tower.
Figure 10:
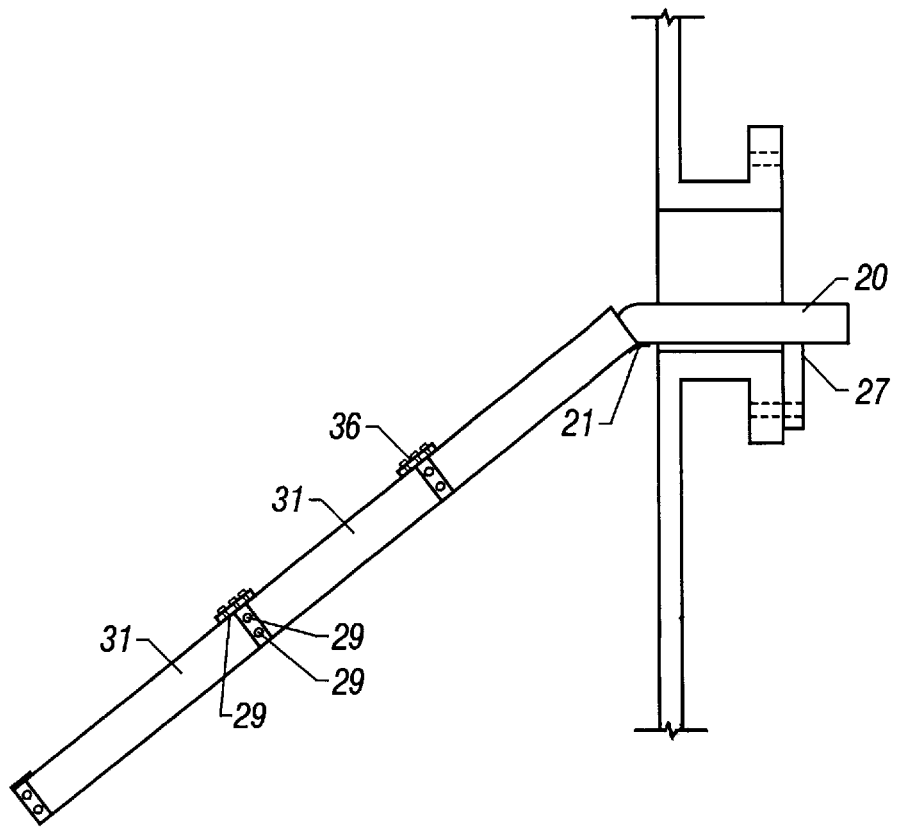
FIG. 10 depicts the inventive loading system in position for use in a process tower.

Slide slope 30 connects to top loading receiver 20. In the preferred embodiment shown in FIG. 7, this connection is accomplished through the use of top loading receiver hinge 21. Top loading receiver hinge 21 is preferably a locking piano hinge, such that it allows top loading receiver 20 to swing downwards as seen in FIG. 10 to attach to manway 25, while restricting upward travel of top loading receiver 20 beyond the slide slope axis 33 of slide slope 30, as shown in FIG. 11. The primary restriction of upward travel of top loading receiver 20 beyond slide slope axis 33 of slide slope 30 is from the shape and orientation top loading receiver 20, which mates against the interior bottom surface uppermost slide slope section 31, as depicted in FIG. 11.

Figure 8:
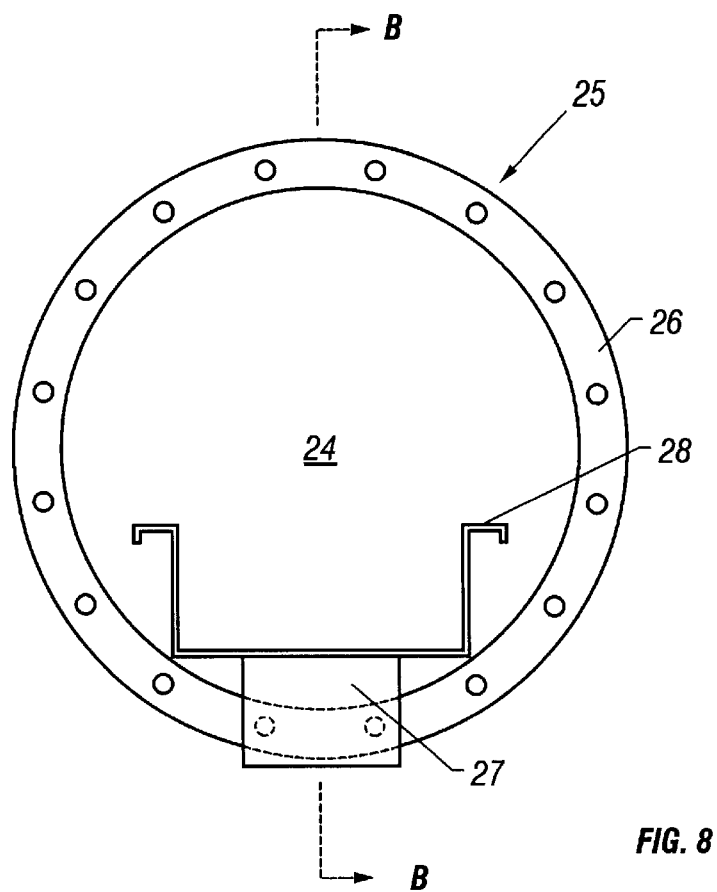
FIG. 8 depicts placement of the top loading receiver in a manway opening.
Figure 9:
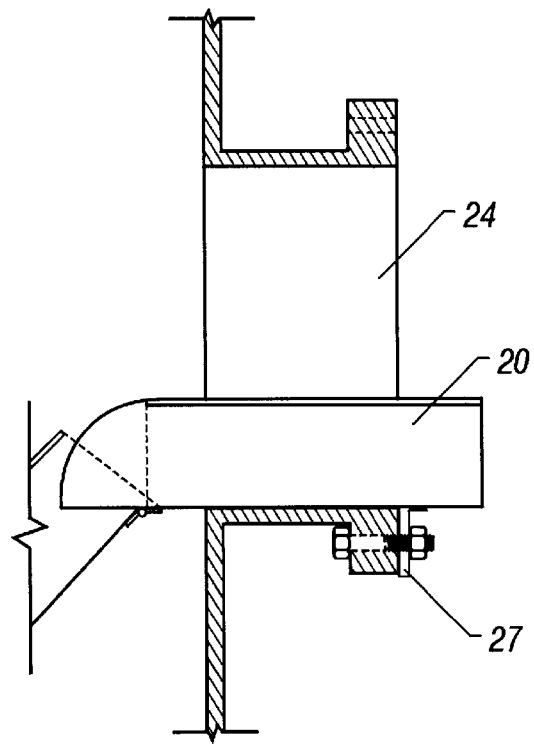
FIG. 9 depicts a cross section of the top loading receiver in a manway opening across line B—B seen in FIG. 8.

Top loading receiver 20 traverses through manway opening 24 when loading system 10 is in use. As shown in the preferred embodiment depicted in FIG. 8 and FIG. 9, top loading receiver 20 is secured to manway flange 26 with mounting bracket 27, which is part of top loading receiver 20. Top loading receiver 20, as well as slide slope sections 31 and bottom staging sections 41, preferably have stiffening lips 28, to provide a rigid support structure to prevent buckling and rotational twisting of loading system 10.

OPERATION

After old packing material is removed from a packing bed volume of process tower 50, loading system 10 is erected inside process tower 50. Access to the interior of process tower 50 is afforded through manways 25. Proximate to manways 25 at elevations are grating landings 23, on which workers can walk and material can be staged.

In a typical embodiment, support legs 47 and bottom staging sections 41 are first lowered down through manway opening 24 to receiving area 45, using ropes or an equivalent hoisting device. Support legs 47 are placed vertically on distribution tray 55, and fastened to at least one bottom staging section 41 to form bottom stage 40. Slide slope 30 is constructed outside of process tower 50 by fastening together slide slope sections 31 end-to-end as described above. Radius section 35 is fastened to slide slope 30 as described above, slide slope 30 is hinged to top loading receiver 20 using top loading receiver hinge 21, and the combined radius/slope/top assembly 32 is inserted through manway opening 24. Radius section 35 is attached to bottom stage 40, and mounting bracket 27 is attached to manway flange 26, thus forming a stable and rigid loading system 10.

Structured packing sections 65 are staged outside manway 25, typically on grating landings 23 at elevations, and each structured packing section 65 is then placed on top loading receiver 20. Structured packing sections 65 are pushed into process tower 50, where they slide down slide slope 30 and down to bottom stage 40 in receiving area 45. Structured packing sections 65 are offloaded and stacked on distribution tray 55. As more structured packing sections 65 are offloaded and stacked, they surround bottom stage 40. When the stacked structured packing sections 65 reach a preselected level, bottom stage 40 is detached from radius/slope/top assembly 32. A load distributing device, such as a piece of plywood, is placed on top of the stacked structured packing sections 65, and bottom stage 40 is placed on top of the plywood. Other structured packing sections 65 are positioned and stacked in the area where bottom stage 40 originally stood, thus forming a now continuous higher level of flooring made of structured packing sections 65. Bottom stage 40 is repositioned on a second load distributing structure (such as a sheet of plywood) that is on top of the stacked structured packing sections 65. At this higher level of flooring, a slide slope section 31 is removed from radius/slope/top assembly 32, and bottom stage 40 is moved laterally closer to manway 25. When bottom stage 40 is then reattached to the shortened radius/slope/top assembly 32, the slope angle of slide slope 30 remains essentially the same, and the speed at which structured packing sections 65 slide down slide slope 30 remains essentially the same as before. This process is repeated until the stacked structured packing sections 65 reach a pre-determined height, that being where additional structured packing sections 65 can be handed directly to a worker inside process tower 50 through manway opening 24. At that point, mounting bracket 27 is disconnected from manway flange 26, radius slope/top assembly 32 is extracted our through manway opening 24, bottom stage 40 is disassembled and its components extracted through manway opening 24. The remaining required structured packing sections 65 are handed to the worker inside process tower 50 to finish out the required height of packing bed 60.

In the alternative, radius section 35 and slide slope sections 31 can be assembled inside process tower 50 and then attached to bottom stage 40, using the same method described above.

The foregoing description of loading structured packing sections 65 is accomplished when loading system 10 is positioned as shown in FIG. 10, with top loading receiver 20 attached to manway 25 by securing mounting bracket 27 to manway flange 26. If an employee needs to exit process tower 50 in the middle of a loading job, loading system 10 occludes too much of manway opening 24 to allow egress. To afford such egression, mounting bracket 27 is disconnected from manway flange 26, and top loading receiver 20 is rotated upward. When mounting bracket 27 clears above manway flange 26, top loading receiver 20 is moved through manway opening 24. This movement can be through movement of all of loading system 10, or by first disconnecting any desired part of loading system 10 and moving only top loading receiver 20 and its attached components of loading system 10. Typically, at least radius/slope/top assembly 32 remain assembled during this step. Top loading receiver 20 is pulled inside process tower 50, and the fully rotated upward until top loading receiver 20 is aligned along slide slope axis 33. Because top loading receiver hinge 21 is a single direction hinge attached to the shape and orientation of top loading receiver 20 described above, top loading receiver 20 is locked against firther upward movement when aligned along slide slope axis 33. Top loading receiver 20 can then be rested against the interior of process tower 50 away from manway opening 24, and the worker can egress, often with the aid of a rope ladder hanging from manway 25. After the worker re-enters process tower 50, these steps are reversed and loading system 10 is again ready for use.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

I claim:

1. A method for loading packing into a petrochemical industry tower, said method comprising:

sliding said packing into an interior of said tower on a removable slide; and arranging said packing on distribution trays within said tower.

2. A method as in claim 1, further comprising offloading said packing from a bottom stage located in a receiving area.

3. A method as in claim 2, further comprising:

stacking said packing on a distribution tray in said receiving area;

disconnecting said bottom stage and a radius section from a slide slope when said packing reaches a pre-determined height;

repositioning said packing to form a packing floor;

removing at least one slide slope section from said slide slope;

repositioning said bottom stage on top of said packing floor; and reconnecting said bottom stage to said slide slope.

4. A method as in claim 3, wherein said packing is a structured packing comprising a plurality of structured packing sections.

5. A method as in claim 4, wherein said tower is a vacuum tower.

6. A method for loading packing into a tower, said method comprising:

sliding said packing into an interior of said tower on a removable slide;

positioning a bottom stage in a receiving area in said interior of said tower;

attaching a slide slope to said bottom stage;

attaching said slide slope to a top loading receiver; and attaching said top loading receiver to a manway.

7. A method as in claim 6, further comprising attaching a radius section between said bottom stage and said slide slope.

8. A method as in claim 6, further comprising:

connecting a radius section to a slide slope and connecting said slide slope to a top loading receiver to form a radius/slope/top assembly;

inserting said radius/slope/top assembly into an interior of said tower; and attaching said radius/slope/top assembly to a bottom stage.

9. A method as in claim 6, wherein:

said removable slide comprises a hingably attached top loading receiver and a slide slope, said hingably attached top loading receiver being attached to a manway during a loading operation, and said hingably attached top loading receiver being unattached and said hingably attached top loading receiver and said slide slope being stowed inside said tower during a personnel egress.

* * * * *